United States Patent [19]

Duyvesteyn et al.

[11] Patent Number: 4,572,771
[45] Date of Patent: Feb. 25, 1986

[54] ZINC RECOVERY FROM STEEL PLANT DUSTS AND OTHER ZINCIFEROUS MATERIALS

[75] Inventors: Willem P. C. Duyvesteyn, Benthuisen, Netherlands; Mahesh C. Jha, Arvada, Colo.

[73] Assignee: Amax Inc., Greenwich, Conn.

[21] Appl. No.: 696,979

[22] Filed: Jan. 31, 1985

[51] Int. Cl.$^4$ .............................................. C25B 1/22
[52] U.S. Cl. .................................... 204/118; 204/128; 204/103; 75/101 BE; 75/114; 75/120; 75/121; 423/100; 423/140; 423/94
[58] Field of Search ................... 75/101 BE, 114, 120, 75/121; 204/128, 103, 118; 423/94, 140, 100

[56] References Cited

U.S. PATENT DOCUMENTS 4,233,273 11/1980 Meyer et al. .................... 75/101 BE
4,401,531 8/1983 San Lorenzo et al. ......... 75/101 BE
4,421,616 12/1983 Bjune et al. .......................... 204/118
4,465,569 8/1984 Bjune et al. .......................... 204/118

Primary Examiner—R. L. Andrews
Attorney, Agent, or Firm—Michael A. Ciomek; Eugene J. Kalil

[57] ABSTRACT

A process is provided for recovering zinc from zinc residues containing iron, and lead. The residue is leached with hydrochloric acid to provide a pregnant liquor containing zinc, iron, and lead. The iron is selectively removed from the pregnant liquor and the zinc extracted from the liquor by an organic solvent extraction system. The zinc is subsequently stripped from the organic solvent using water or hydrochloric acid to provide a zinc chloride solution which is then fed to an electrowinning cell for the production of marketable electrolytic zinc.

5 Claims, 1 Drawing Figure

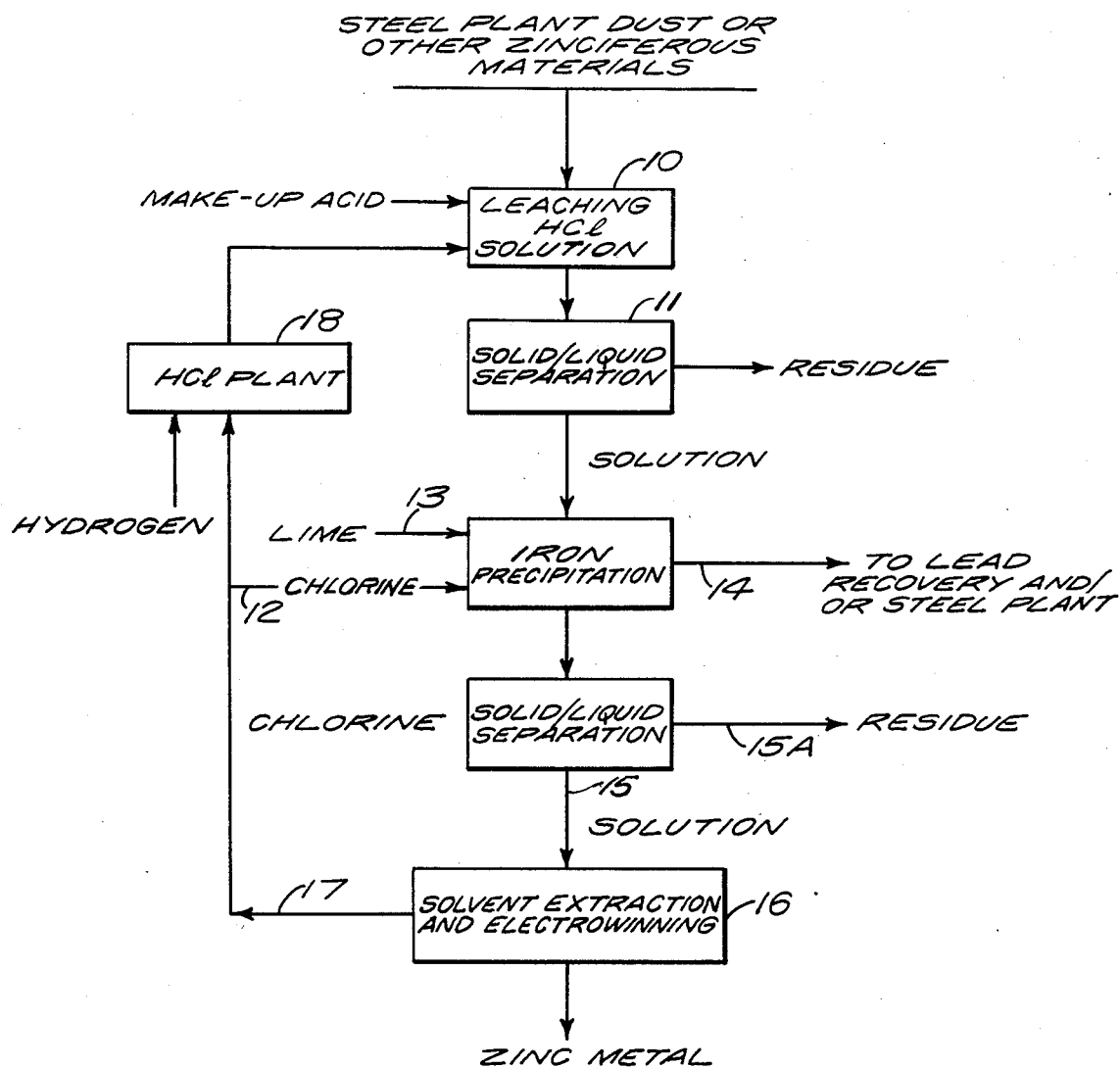

4,572,771

ZINC RECOVERY FROM STEEL PLANT DUSTS AND OTHER ZINCIFEROUS MATERIALS

BACKGROUND OF THE INVENTION

During melting and refining of steel, the gas leaving the furnace carries a substantial amount of fine dust particles. To protect the atmosphere, these particles are removed in cyclones, scrubbers, and other similar devices. The dust particles are made up of two types of materials. Firstly, it consists of fine particles charged to the furnace, such as those of iron oxides, calcium oxide, and silica, which are mechanically carried away by the gas. Secondly, it consists of oxide particles of nonferrous metals, such as zinc and lead, which evaporate at the high temperatures of the steel bath and later condense and oxidize in the flue. The amounts of these nonferrous metal oxides in the dust increase as the dust is repeatedly recycled or as more scrap containing these metals are charged into the furnace.

The dust can be repeatedly recycled only for a limited number of cycles. With each recycle, the amount of dust to be collected increases due to larger proportion of the very fine dust particles in the feed. The feeding of such fine particles of low bulk density becomes increasingly difficult. Furthermore, as the amount of recycled dust increases, the energy requirement for reducing and melting iron and other metals from the dust increases.

Also, with repeated recycling, the nonferrous metal content of the dust increases to the point where their return to the steel bath adversely affects the steel melting operation. As oxides present in the slag, they attack the refractory lining of the furnace. In reduced form, these metals enter the molten steel at concentrations higher than permissible to meet specifications for proper mechanical and physical properties of the steel. At this point, the dust has to be removed from the system. Traditionally this dust has been considered a waste material and disposed of in landfills.

This disposal method is becoming more expensive, not only because of increasing land and transportation costs but also because of increasingly stringent environmental protection regulations. Since the dust particles are very fine, they are likely to become airborne unless they are agglomerated to some extent or kept covered. Furthermore, the chemical nature of these dust particles are such that they classify as hazardous waste, based on the EP toxicity test prescribed by the U.S. Environmental Protection Agency. As detailed in the article entitled "Characterization of Steelmaking Dusts from Electric Arc Furnace", *United States Bureau of Mine's Report of Investigation No.* 8750 (1983) by S. L. Law et al., the toxicity is related to the presence of lead, cadmium, and sometimes chromium, which article is incorporated herein by reference.

In view of the above, there has been an increasing interest in developing processes that will permit removal and recovery of nonferrous metals such as zinc, lead, and cadmium from the steel plant dusts. The dust, depleted of these metals, can be recycled back to the steel furnace for recovery of iron or can be stored as a nontoxic waste. Since the tonnage of this material is substantial (about 500,000 tons was produced in 1979 from United States electric furnace operations only, according to the aforementioned article), it represents an important source of zinc, lead and iron metals.

STATE-OF-THE-ART AND SHORTCOMINGS OF THE EXISTING PROCESSES

Because of increasing awareness for environmental concerns in the 1960's, several organizations attempted to develop processes for recovery of zinc and lead from the steel plant dusts. At that time, pyrometallurgical processes were popular in primary zinc and lead industries, and therefore, it is not surprising that similar processes were attempted to treat the steel plant dust. Basically, the processes were variations of the commercial Waelz Process. In essence, the dust is partly reduced at high temperatures to volatilize zinc and lead metals, which are then oxidized and condensed as mixed oxides. A variety of equipment have been suggested to perform the actual operations of reduction, oxidation, and condensation, as detailed in numerous U.S. patents listed below.

| U.S. Pat. No. | Data | Inventor(s) |
|---|---|---|
| 3,262,771 | 7/1966 | Ban |
| 3,403,018 | 9/1968 | Thom |
| 3,754,890 | 8/1973 | Fitch |
| 3,756,804 | 9/1973 | Stevenson |
| 3,770,416 | 11/1973 | Goksel |
| 3,850,613 | 11/1974 | Allen |
| 4,396,423 | 8/1983 | Stephens, et al |
| 4,396,424 | 8/1983 | Yatsunami, et al |

None of these processes have been implemented on commercial scale. This is chiefly because of high capital and operating costs involved with high temperature ($\sim 1,200°$ C.) operations that not only need expensive energy but also require elaborate gas handling and cleaning systems to reduce the atmospheric pollution. The presence of chloride and fluoride salts in the dust causes severe corrosion problems and necessitates use of expensive alloys as materials of construction. Another major shortcoming of the pyrometallurgical processes is that both lead and zinc are collected together in one intermediate product that needs considerable further processing to separate the two metals.

As an alternative, hydrometallurgical processes have been investigated, particularly after the escalating energy costs experienced in the early 1970's. It is also worth noting that about 90 percent of the primary zinc is now produced by a hydrometallurgical process.

One hydrometallurgical method, disclosed in U.S. Pat. No. 3,849,121 granted to Burrows, recommends the use of ammonium chloride as a lixiviant. Another process, disclosed in U.S. Pat. No. 4,071,357 granted to Peters, recommends use of ammonia and carbon dioxide gases. Use of strong caustic as a lixiviant is suggested in European Pat. No. 0040659 granted to Pooley et al. These alkaline leaching processes suffer from three common shortcomings: (1) the solutions generated are not compatible with existing zinc plant operations which all treat zinc sulfate solutions, (2) lead is also dissolved in these processes along with the zinc, and (3) the reagents are expensive.

Acid leaching of the steel plant dust would overcome some of these shortcomings. An article by D. Pearson entitled "Recovery of Zinc From Metallurgical Dusts and Fumes," Chapter 14, of the publication *Process and Fundamental Considerations of Selected Hydrometallurgical Systems*, M. C. Kuhn, Editor, Society of Mining Engineers of AIME (1981, pp. 153-168) describes the work performed at Warren Springs Laboratory in which sulfuric acid was used to dissolve the zinc from electric arc furnace dusts. While zinc recovery of about 80 percent was obtained, iron dissolution was extensive, about 20 to 22 g/L, indicating high acid consumptions. An even more serious problem was the separation of residual solids from the solution.

The iron dissolved during sulfuric acid leaching has to be removed prior to further purification of solution and recovery of pure zinc. One can consider the conventional electrolytic zinc plant practice as the state-of-the-art in this field. In fact, many of the plants treat their normal leach residue, a zinciferous material similar to the steel plant dust in many respects, to recover zinc from it. Strong sulfuric acid is used as a lixiviant. Three types of processes, jarosite, goethite, or hematite, are available to precipitate the iron from these leach liquors as described in an article by A. R. Gordon et al. entitled "Improved Leaching Technologies in the Electrolytic Zinc Industry," *Metallurgical Transactions*, Vol. 6B, March 1975, pp. 43–53.

The iron is generally precipitated from the solution as jarosite. This process requires external reagents such as sodium, potassium, or ammonium compounds. The voluminous precipitate contains low concentrations of iron, generally less than 30 percent, and high concentrations of sulfur, which is not suitable as a feed to the steel plant furnaces.

An alternative procedure is to precipitate iron as goethite, which has a higher iron content than jarosite. The process is, however, slow and complicated, involving first reduction of ferric iron, then neutralization with calcine and finally oxidation with air. However, the process is more popular than the hematite process, which requires the use of an autoclave.

It would, therefore, be desirable to provide a process which utilizes its own byproduct for lixiviation and precipitation of iron in a form that not only settles well but is also suitable for recycle to the steel furnace. We have discovered that the hydrochloric acid leaching system provides such a process, when chlorine produced during the electrowinning step is recycled and used to precipitate iron, as well as for a lixiviant after conversion to HCl.

OBJECTS OF THE INVENTION

It is an object of this invention to provide a process for recovering zinc from finely divided zinciferous materials such as steel plant dusts and zinc plant leach residues that contain other nonferrous metal impurities.

Another object is to provide a hydrometallurgical process for recovering zinc from these materials in the form of substantially pure electrolytic zinc.

Still another object is to recycle the byproduct chlorine for leaching and purification purposes, while precipitating iron as low sulfur, high iron materials suitable for recycle to steel plants.

These and other objects will more clearly appear when taken in conjunction with the following disclosure, the appended claims, and the accompanying drawing.

BRIEF DESCRIPTION OF THE DRAWING

The drawing is a flowsheet showing the hydrometallurgical treatment of zinciferous steel plant dust in which zinc metal is subsequently recovered.

SUMMARY OF THE INVENTION

As shown by the flowsheet, the first step 10 in the process involves hydrochloric acid leaching of the finely divided steel plant dust or zinciferous material. After a solid/liquid separation step 11, the solution is oxidized with chlorine 12 and simultaneously neutralized with lime 13 to precipitate iron out of the solution. The easy settling residue from this step is rich in iron content and practically free of sulfur so that it can be recycled at 14 to a steel furnace either by itself or in combination with the residue from the leach step. Optionally, the residue can be treated to recover lead and other values prior to its return to the steel plant. The iron free solution 15 following solid/liquid separation from residue 15A can be further purified by solvent extraction and the purified zinc chloride electrolyte subjected to electrowinning 16. The electrowon zinc metal is a marketable product. The chlorine gas 17 released during electrowinning is recycled to the system partly as chlorine 12 to oxidize the iron and partly as hydrochloric acid 18 to dissolve more zinc.

The process of this invention is versatile in the sense that it can treat a variety of feed materials containing a wide range of zinc values. There is considerable flexibility in leaching and in iron precipitation conditions as described below in some detail and shown by the various examples.

DETAILS OF THE INVENTION

The invention is applicable to all types of zinciferous materials, particularly the steel plant dusts. As detailed in the aforementioned S. L. Law et al. article, these dusts can vary considerably in their composition. For example, they may contain about 20 to 60 percent iron, about 5 to 40 percent zinc, and about 0.5 to 6 percent lead. In addition to these two metals of interest, the dusts contain substantial amounts of oxides of other metals such as lead, calcium, manganese, silicon, magnesium, aluminum, etc. The chemical composition of a typical midwest steel plant dust used in testing of the process of this invention is presented in Table 1.

TABLE 1

| Chemical Composition of the Steel Plant Dust Used in the Test Work | |
|---|---|
| Element | Weight Percent |
| Iron | 27.8 |
| Zinc | 25.8 |
| Lead | 3.03 |
| Cadmium | 0.041 |
| Calcium | 6.07 |
| Manganese | 3.12 |
| Silicon | 2.47 |
| Aluminum | 0.57 |
| Copper | 0.16 |
| Chlorine | 3.3 |
| Fluorine | 1.1 |

Plus small amounts of barium, chromium, magnesium and sodium. Balance essentially oxygen.

The chemistry of the process is based on the relative insolubility of iron oxides in mildly acidic chloride solutions. Zinc oxide, on the other hand, forms soluble chloride. The temperature and pH are the main process variables affecting the efficiency of the process as discussed hereinafter.

As illustrative of the invention, the following examples are given:

EXAMPLE 1

The composition of the steel plant dust used in the test work is summarized in Table 1. A pulp density of about 10 percent, 100 g feed, and 900 ml of lixiviant was used in all the tests because it yields a zinc concentration of about 20 g/L in solution (filtrate and wash combined), compatible with the practice of solvent extraction and electrowinning processes for recovery of zinc from such solutions. The leaching was performed in a glass reactor equipped with a condenser, stirrer, thermometer, and a pH probe. The reactor was heated by an electric mantle connected to a temperature controller. After the reaction was essentially complete (a residence time of 1 hour was provided for this), a small amount of flocculant referred to by the trademark DOW MG-200 was added to the slurry and it was filtered hot. The first wash (about 2 bed volumes) was combined with the filtrate and called leach liquor. It was analyzed for zinc, iron, and lead. The cake was then washed thoroughly with water, dried, weighed, and analyzed for zinc, iron, and lead. The analyses in the feed and residue were used to calculate the percent of metals leached.

Three similar tests were performed using 75 g/L HCl as lixiviant but at different temperatures of 30°, 50° and 90° C. The results are presented in Table 2. It was seen that increasing the temperature resulted in increased dissolution of all the three metals, even though the amount of acid used was the same in all the tests. The dissolution of zinc and lead was much more complete in comparison to iron. As the solution cooled to room temperature, lead chloride crystals came out of the solution so that the filtrates contained only about 1 g/L lead. The zinc and iron concentrations varied between 18 and 24 g/L and 7, and 12 g/L, respectively. Also, the filtering of the slurry from the higher temperature test was faster.

Out of the other elements present in the dust, it is estimated that almost all the calcium and cadmium, about 80 percent of the copper, 70 percent of the manganese, and 55 percent of the aluminum dissolved in the 90° C. leaching test. Thus, the residue was enriched in iron content to about 52 percent.

TABLE 2

Effect of Temperature on HCl Leaching of Steel Plant Dust

| Test Number | 1 | 2 | 3 |
|---|---|---|---|
| Temperature, °C. | 30 | 50 | 90 |
| Metals Leached, Percent | | | |
| Zinc | 82 | 86 | 88 |
| Lead | 79 | 83 | 94 |
| Iron | 34 | 43 | 48 |

EXAMPLE 2

A series of three tests was performed following the procedure described in Example 1, except that the HCl concentration in the lixiviant was varied, resulting in different final pH while keeping the temperature of leaching constant at 90° C. The results appear in Table 3. It is seen that extremely high acid concentrations attacked zinc ferrite, resulting in 100 percent dissolution of zinc, as well as 93 percent dissolution of iron. Other nonferrous metals such as calcium, cadmium, copper, and manganese were also completely dissolved. On the other hand, a low acid concentration of 40 g/L, resulting in a final pH of 2.5, dissolved very little iron and a majority of the zinc and lead (74 and 83 percent, respectively). Most of the cadmium and calcium still dissolved; however, the extents of aluminum, copper, manganese dissolutions were less than 50 percent.

TABLE 3

Effect of pH on HCl Leaching of Steel Plant Dust

| Test Number | 1 | 2 | 3 |
|---|---|---|---|
| Initial HCl Concentration, g/L | 200 | 75 | 40 |
| Final pH | 0 | 1.2 | 2.5 |
| Metals Leached, Percent | | | |
| Zinc | 100 | 88 | 74 |
| Lead | 100 | 94 | 83 |
| Iron | 93 | 48 | 11 |

EXAMPLE 3

A series of four tests was performed to investigate the iron precipitation step. The leach liquors from tests described in Example 1 were blended together to form a feed solution. Each of the four neutralization tests was run on 400 ml of this solution. Other test conditions are detailed in Table 4. The tests were run for 2 hours. At that point, the slurry was flocculated and filtered. The filtrates were analyzed for zinc, lead, and iron.

The results presented in Table 4 show that iron can be precipitated out to very low levels. Higher temperature and higher pH resulted in lower iron concentration in solution. At 90° C. and pH of 4, the iron concentration was down to 1 ppm. Both chlorine and oxygen were effective in maintaining the oxidation potential of solution (Eh) above 700 mV vs. the standard calomel electrode. In comparison to chlorine, use of air generates less acid and thus a considerable higher pH was achieved in Test 3. The filtering characteristics of the solids were somewhat better when chlorine was used. The composition of the precipitate, presented in Table 4, does not show any significant effect of variables.

TABLE 4

Details of Iron Precipitation Tests

| Test Number | 1 | 2 | 3 | 4 |
|---|---|---|---|---|
| Test Conditions | | | | |
| Temperature, °C. | 90 | 90 | 90 | 25 |
| Oxidizing Gas | Chlorine | Chlorine | Air | Chlorine |
| Lime Addition, g | 12 | 10 | 10.5 | 12 |
| Test Results | | | | |
| Final pH | 2.73 | 2.69 | 4.03 | 2.48 |
| Final Eh, mv (vs. SCE)* | 700 | 700 | 700 | 700 |
| Final Liquor Analysis, g/L** | | | | |
| Zinc | 16.4 | 18.7 | 19.9 | 16.6 |
| Lead | 0.63 | 0.62 | 0.63 | 0.52 |
| Iron | 0.077 | 0.134 | 0.001 | 0.184 |
| Precipitate Analysis, % | | | | |
| Iron | 44.3 | 46.3 | 49.8 | 43.3 |
| Lead | 0.85 | 1.1 | 1.3 | 1.5 |
| Calcium | 0.35 | 0.10 | 1.0 | 0.09 |
| Sulfur | 1.7 | 1.1 | 0.87 | 1.2 |

*SCE is Standard Calomel Electrode.
**The feed liquor contained 19.7 g/L zinc, 0.97 g/L lead, and 9 g/L iron.

The effects of temperature of leaching and pH in carrying out the invention will be clearly apparent from the following discussion:

Effect of Temperature on Leaching

As shown by Example 1, the leaching can be performed at ambient conditions or at somewhat higher temperature. There is no need to exceed the boiling point and, therefore, the process does not require pressure vessels. The higher temperature, 90° C. as compared to 30° C., resulted in better filtering characteristics of the leach residue, as well as in higher zinc recoveries. The higher temperature also resulted in higher dissolution of lead and iron. The lead, which dissolved at higher temperatures, can easily be recovered as lead chloride crystals when the solution is cooled. Alternatively, it can be removed from the solution in the iron precipitation step, thus avoiding the need of an additional solid/liquid separation step. In view of this, further testing of the process was carried out at 90° C. It is worth noting that the leaching reaction is exothermic. Thus, by using a well insulated commercial reactor, the requirements for external heating will be relatively small. In summary, the temperature may range from ambient to below the boiling point, e.g., from about 30° C. to 90° C.

Besides zinc and lead, significant amounts of other nonferrous metals also dissolved (see Example 1 for details). The residue, therefore, was enriched to about 52 percent iron. This residue, with its relatively low nonferrous metal contents and practically no sulfur (less than 0.1 percent), should be a good feed for steel plant furnaces.

Effect of pH on Leaching

Example 2 shows the effect of pH (governed by the initial HCl concentration of the lixiviant) on the leaching of zinc, lead, iron, and other metals from steel plant dusts. It is seen that 100 percent of zinc can be dissolved by using very high acid concentrates (200 g/L), which resulted in a pH of 0. These conditions, however, led to the dissolution of over 90 percent of iron, along with complete dissolution of most of the other nonferrous metals. A low acid concentration (40 g/L) and a final pH of 2.5 resulted in very little iron dissolution (11 percent), while still permitting 74 percent dissolution of zinc and 83 percent dissolution of lead. The amount of hydrochloric acid may range from about 75 gpl to 200 gpl. Preferably, the pH should be less than about 1.

Since the leach liquor has to be neutralized with lime or some other base and iron has to be precipitated in the purification step, a mildly acidic leach liquor (pH of 1 to 3) may be used in place of strongly acidic leach liquors (pH of less than 0.5). However, it may be advantageous to accomplish the leaching in a staged countercurrent system. The first stage will receive all the HCl and discharge the leach residue. This stage can be maintained at a pH of 0.5 or even less. The last stage will receive the steel plant dust and discharge the leach liquor. This stage can be operated at a pH of 2.5 to 3. While such a system offers best utilization of reagents, extra cost is involved in equipment (interstage thickeners and pumps).

During leaching, the pulp density of the slurry may range by weight from about 5 percent to 40 percent.

Iron Precipitation

Iron was the major impurity in leach liquors. Its concentration was as high as 22 g/L when a very high acid concentration was used in leaching (pH 0). On the other hand, the concentration was only about 2 g/L when low acid concentration was used in leaching (pH 2.5). A blend of leach liquors at moderate acid concentration (pH 0.6), and analyzing about 9 g/L iron, was used in iron precipitation tests described in Example 3. It was found that by adding lime to raise the pH to about 2.5 to 2.7 range, and sparging chlorine, the iron concentration can be dropped down to 100 to 200 ppm and less. Higher iron concentration and poorer filtering characteristics were obtained in the room temperature test in comparison to the 90° C. tests. When air was used for sparging instead of chlorine the final pH was 4 due to less acid formed. This resulted in an iron content of 1 ppm. The settling characteristics of precipitate was somewhat inferior. However, chlorine is preferred at a pH range of about 2 to 3.5, e.g., about 2 to 3 to precipitate iron to a level below 200 ppm at an oxidation voltage Eh substantially in excess of 300 mv and ranging up to about 700 mv.

Out of the other elements present in the solution, most of the manganese and some of the lead was also precipitated. Calcium concentration, on the other hand, increased significantly. Aluminum, copper, and cadmium remained unaffected at about 0.4, 0.1, and 0.03 g/L, respectively, in the solution containing 16 to 19 g/L zinc.

The composition of the precipitates are shown in Table 4. Because of the high iron and low sulfur and lead contents, it can probably be recycled directly to a steel melting furnace. Alternatively, the lead sulfate can be dissolved in a brine solution, as disclosed in our copending patent application Ser. No. 696,986, filed Jan. 31, 1985, and the remaining solids pelletized as described in our copending patent application Ser. No. 696,981 filed Jan. 31, 1985, prior to the recycle of the pellets to a steel furnace.

Further Purification and Zinc Recovery

The filtrate from the iron precipitation step can be further purified by solvent extraction. A preferred extractant for zinc is di-(2-ethylhexyl) phosphoric acid, commonly known as D2EHPA. Generally, this extractant is used for zinc sulfate solutions, as described in U.S. Pat. No. 4,401,531. However, the extractant can selectively extract zinc from chloride solutions also as described in U.S. Pat. No. 4,288,304. Other possible extractants include di-2-ethyl-phosphonic acid (HEH-/EHP), di-(2,4,4-trimethylpentyl) phosphinic acid and tri-butyl phosphate, commonly known as TBP.

Typical water-immiscible solvents for the extractants include kerosene, aliphatic and aromatic organic solvents. The concentration of the extractant in the organic may range from about 5 percent to 40 percent by volume.

The loaded organic can be stripped with hydrochloric acid or water, to produce pure zinc chloride solutions. Electrowinning of pure zinc from zinc chloride solutions is a known art, as described in the article entitled "Zinc Electrowinning from Chloride Electrolyte" by D. J. Mackinnon et al., *Mining Engineering*, April 1982 (pp. 404-414) which is incorporated herein by reference.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. In a process wherein a zinc-containing oxide residue also containing iron and lead is leached with hydrochloric acid to provide a pregnant liquor containing zinc which is subsequently recovered by electrolysis as electrolytic zinc, the improvement which comprises, mixing a charge of finely divided zinc-containing oxide residue containing about 5 to 40% of zinc, about 20 to 60% of iron and about 0.5 to 6% lead with a hydrochloric acid solution in a leaching stage to form a slurry thereof, the acid concentration corresponding to a pH of less than about 1, and the temperature thereof including the acid concentration being at least sufficient to dissolve said contained zinc and provide a pregnant liquor thereof also containing at least iron and provide an undissolved residue, separating said pregnant liquor from said undissolved residue, controlling the pH of said pregnant liquor at a pH ranging from about 2 to 4, oxidizing said solution by passing chlorine gas therethrough to provide an oxidation voltage Eh substantially in excess of 300 mv and ranging up to about 700 mv, thereby precipitating the contained iron and any lead present, separating said precipitate from said zinc-containing solution and provide a filtrate thereof, selectively removing said zinc from said filtrate using an organic solvent containing an extractant selected from the group consisting of di-(2-ethylhexyl) phosphoric acid, di-2-2ethyl-phosphonic acid, di-(2,4,4-trimethylpentyl) phosphinic acid and tri-butyl phosphate and provide a substantially pure zinc solution thereof, selectively stripping said zinc from said organic solvent using an aqueous medium selected from the group consisting of water and a hydrochloric solution and provide an electrolyte of zinc chloride, subjecting said zinc chloride electrolyte solution to electrowinning, wherein electrolytic zinc is produced together with free hydrochloric acid and free chlorine, recycling said free hydrochloric acid to the leaching stage, and recycling as an oxidant the chlorine gas formed during electrowinning to the pregnant liquor to oxidize the solution to said oxidation voltage level and precipitate at least iron therefrom.

2. The process of claim 1, wherein the hydrochloric acid leaching solution has a concentration ranging from about 75 gpl to 200 gpl HCl, wherein the temperature of the solution ranges from about ambient to below the boiling point, and wherein the slurry has a pulp density of about 5% to 40%.

3. The process of claim 2, wherein the temperature during leaching ranges from about 30° C. to 90° C.

4. The process of claim 1, wherein the pH of the pregnant liquor following dissolution of zinc is controlled over a range of about 2 to 3.5.

5. The process of claim 1, wherein the extractant in the organic solvent ranges from about 5% to 40% by volume of the solvent extractant mixture.

* * * * *